US007102836B2

(12) United States Patent
Kim et al.

(10) Patent No.: US 7,102,836 B2
(45) Date of Patent: Sep. 5, 2006

(54) OBJECTIVE LENS DRIVING APPARATUS FOR OPTICAL PICKUP

(75) Inventors: Kwang Kim, Gyeonggi-do (KR); Doo-hwan Kim, Seoul (KR); Jin-won Lee, Gyeonggi-do (KR); Young-min Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 10/614,701

(22) Filed: Jul. 8, 2003

(65) Prior Publication Data

US 2004/0070850 A1  Apr. 15, 2004

(30) Foreign Application Priority Data

Jul. 9, 2002 (KR) ................. 2002-39781

(51) Int. Cl.
*G02B 7/02* (2006.01)
*G02B 7/04* (2006.01)
*G11B 7/00* (2006.01)
*G11B 7/085* (2006.01)

(52) U.S. Cl. ............... 359/813; 359/824; 359/814; 369/44.15; 369/44.16; 369/112.23; 250/201.5; 720/683

(58) Field of Classification Search ............... 359/813, 359/814, 823, 824, 811; 369/44.14, 44.15, 369/44.16, 244, 44.22, 112.23; 720/683; 250/201.5
See application file for complete search history.

(56) References Cited

U.S. PATENT DOCUMENTS 5,724,197 A * 3/1998 Barnes et al. ............... 359/824
5,905,255 A    5/1999 Wakabayashi et al. ... 250/201.5
6,134,058 A * 10/2000 Mohri et al. ................. 359/824
6,344,936 B1   2/2002 Santo et al. ................. 359/824
6,519,100 B1 * 2/2003 Tanaka ........................ 359/824
6,532,118 B1 * 3/2003 Ohno ........................... 359/824
6,775,207 B1 * 8/2004 Takeshita et al. ......... 369/44.15
2002/0021651 A1  2/2002 Hong et al. ............. 369/112.23
2002/0150002 A1* 10/2002 Pae et al. ................. 369/44.16

FOREIGN PATENT DOCUMENTS

| CN | 1459784 | 12/2003 |
|---|---|---|
| EP | 1 369 854 | 12/2003 |
| JP | 10-261233 | 9/1998 |
| JP | 10 261233 | 9/1998 |
| JP | 2001-093177 | 4/2001 |
| JP | 2003-346366 | 12/2003 |

* cited by examiner

*Primary Examiner*—Loha Ben
(74) *Attorney, Agent, or Firm*—Stein, McEwen & Bui, LLP

(57) ABSTRACT

An objective lens driving apparatus for an optical pickup includes a blade on which an objective lens can be mounted, a plurality of elastic support members supporting the blade and capable of elastically moving with respect to the blade, and a servo mechanism driving the blade up and down, left and right, and in a rotational direction. The elastic support members are grouped into pairs arranged to face each other with respect to a center of rotation of the blade, and distances between the elastic support members in the respective pairs are substantially identical. By lessening the difference in the amount of deformation between the elastic support members supporting the blade during tilt control, the elastic support members are less likely to move in undesired directions when vibration is applied.

16 Claims, 8 Drawing Sheets

OBJECTIVE LENS DRIVING APPARATUS FOR OPTICAL PICKUP

CROSS-REFERENCE TO RELATED APPLICATION

This application claims the benefit of Korean Patent Application No. 2002-39781, filed on 9 Jul. 2002, in the Korean Intellectual Property Office, the disclosure of which is incorporated herein by reference.

BACKGROUND OF THE INVENTION

1. Field of the Invention

The present invention relates to an objective lens driving apparatus used with an optical pickup, and according to one aspect of the invention, to an objective lens driving apparatus used with an optical pickup having an improved arrangement structure including an elastic support member supporting a blade on which an objective lens is mounted to be capable of elastically moving.

2. Description of the Related Art

In general, optical pickups record or reproduce information on or from a disk, a recording medium, by emitting light thereon. The light emitted from the optical pickup must be perpendicularly incident on a recording surface of a disk to form a light spot with the most accurate focus. If a light incident direction is inclined, an accurate light spot cannot be formed on the disk so that an error may occur during recording and reproduction of data. Thus, to form a light spot accurately on a desired track, the light must be perpendicularly incident on the recording surface of the disk. The adjustment of the light to be perpendicularly incident on the recording surface of the disk is referred to as tilt adjustment or skew adjustment. Typically, an optical pickup apparatus includes a servo-mechanism controlling the position of the objective lens in a focusing direction and a tracking direction so that the focus of light can be accurately formed on a desired track of a recording surface of a disk. However, while the servo-mechanism controls the focus of a light spot by maintaining a predetermined distance between the objective lens and the recording surface of the disk and the light spot to trace a desired track, it does not directly control the incident angle between the light and the recording surface of the disk. Thus, for more accurate recording and reproduction, a way to dynamically control the tilt is needed.

To meet the above demand, one type of objective lens driving apparatus for an optical pickup, as shown in FIG. 1, has been suggested. The optical pickup is a servo-mechanism to control the position of an objective lens 1 and includes a focus control mechanism 100 driving a blade 2. The objective lens 1 is mounted in a focus direction A, a tracking control mechanism driving the blade 2 is mounted in a tracking direction B, and a tilt control mechanism driving the blade 2 is mounted in a tilt direction C.

The focus and tracking control mechanisms are formed by a pair of focus coils 3a and 3b, a tracking coil 4, and a magnet 6. Thus, during control, an electromagnetic force driving the blade 2 in a corresponding direction is generated by applying current to the focus coils 3a and 3b and the tracking coil 4.

The tilt control mechanism can be formed separately from the focus and tracking control mechanisms. However, as shown in FIG. 1, the tilt control mechanism can be formed to be also used as the focus control mechanism. That is, during tilt control, an electromagnetic force to drive the blade 2 in the tilt direction C can be generated by applying current in a different way from the current applied during control to the focus coils 3a and 3b symmetrically arranged, for example along the tracking direction B. In other words, during focus control, currents are identically applied to the left and right focus coils 3a and 3b to drive the blade 2 in the focus direction A. During tilt control, currents are applied in different directions to the focus coils 3a and 3b to drive the blade 2 in the tilt direction C.

A plurality of wires W, elastically supporting movement of the blade 2 with respect to a holder 5 are typically arranged as shown in FIGS. 2A and 2B. FIG. 2A shows part of the structure of FIG. 1 in a simple form for the convenience of explanation. However, in this wire arrangement, a possibility exists that the position of the blade 2 becomes unstable during driving of the blade when the tilt is high. That is, as shown in FIG. 2B, three pairs of wires W1 and W6, W2 and W5, and W3 and W4 are arranged to face each other with respect to a point P which is the center of rotation when the blade 2 is being driven in a tilt direction C. Among these wire pairs, two pairs i.e. W1 and W6, and W3 and W4, have the same distance therebetween (d1=d3), while the other pair i.e. W2 and W5 has a different distance therebetween (d2≠d1=d3).

In this structure, it is assumed that the blade 2 can be moved by an angle θ by the operation of the tilt control mechanism as shown in FIG. 3A. In this case, comparing the amounts of deformation between the first and second wires W1 and W2, as shown in FIG. 3B, the amount of deformation of the first wire W1 is that r1×θ (r1=d1/2) and the amount of deformation of the second wire W2 is that r2×θ (r2=d2/2) which is less than the amount of deformation of the first wire W1. Likewise, the amounts of deformation of the third, fourth, and sixth wires W3, W4, and W6 are the same as that of the first wire W1 while the amount of deformation of the fifth wire W5 is the same as that of the second wire W2. That is, the first, third, fourth, and sixth wires W1, W3, W4, and W6 are bent to a relatively greater degree than the second and fifth wires W2 and W5 are bent.

A compression force acts on the second and fifth wires W2 and W5 so that the second and fifth wires W2 and W5 can be buckled as shown in FIGS. 4A and 4B. This is a very unstable configuration and, even if a slight vibration or impact is applied, the buckled wires can be elastically expanded so that the blade 2 may be moved in an undesired direction. Therefore, the entire system controlling the position of the objective lens 1 can become unstable. Thus, an improved structure to solve the above problem is demanded.

SUMMARY OF THE INVENTION

The present invention provides an objective lens driving apparatus used with an optical pickup having an improved structure to support the blade so that the position of the blade can be stably supported during tilt control.

According to an aspect of the present invention, an objective lens driving apparatus for an optical pickup comprises a blade on which an objective lens is mounted and, a plurality of elastic support members supporting the blade capable of elastically moving with respect to the blade A servo mechanism drives the blade up and down, left and right, and in a rotational direction. The elastic support members are grouped into pairs of elastic support members arranged to face each other with respect to a center of rotation of the blade, and distances between the elastic support members in the respective pairs are equal.

According to another aspect of the present invention, an objective lens driving apparatus for an optical pickup, comprises a blade on which an objective lens is mounted, a plurality of elastic support members supporting the blade and capable of elastically moving with respect to the blade, and a servo-mechanism driving the blade up and down, left and right, and in a rotational direction. The elastic support members are divided into a first group of elastic support members symmetrically arranged at positions separated a first distance from a center of rotation and a second group of elastic support members symmetrically arranged at positions separated a second distance from the center of rotation. A gap between the neighboring elastic support members in each of the first and second groups is smaller than gaps between the individual elastic support members in each group.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the preferred embodiments the attached drawings in which.

DETAILED DESCRIPTION OF THE INVENTION

Figure 1:
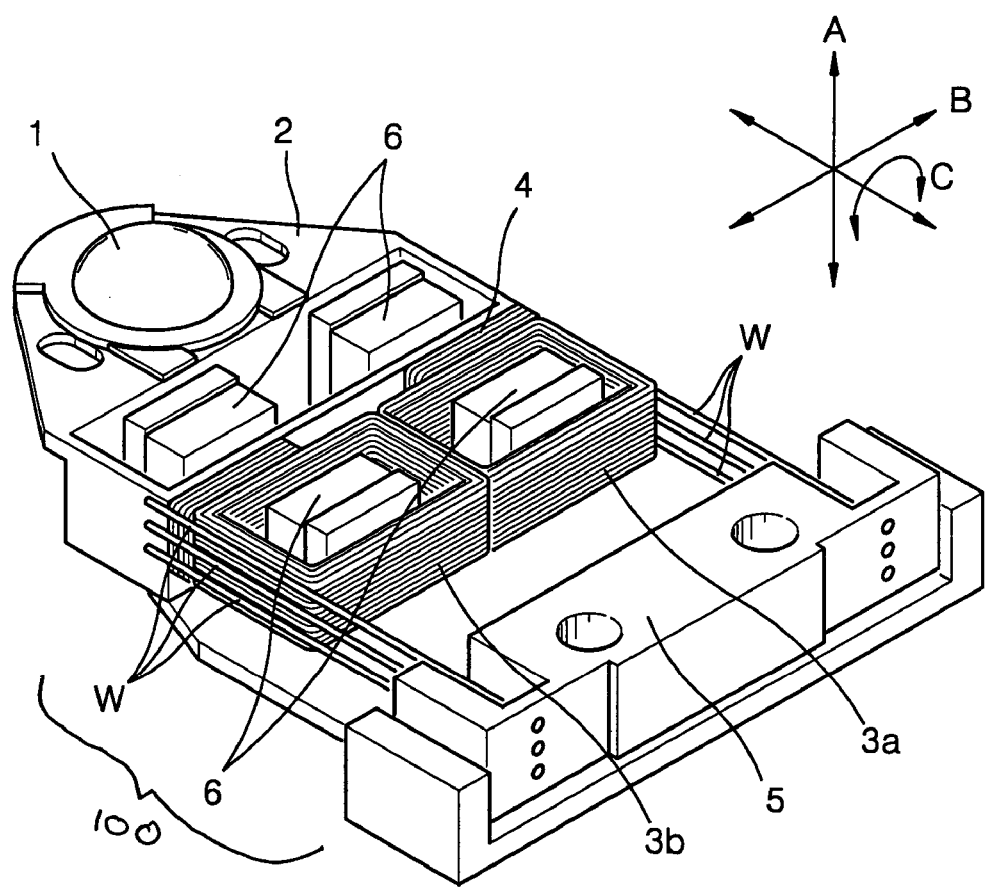
FIG. 1 is a view illustrating a conventional objective lens driving apparatus.
Figure 2A:
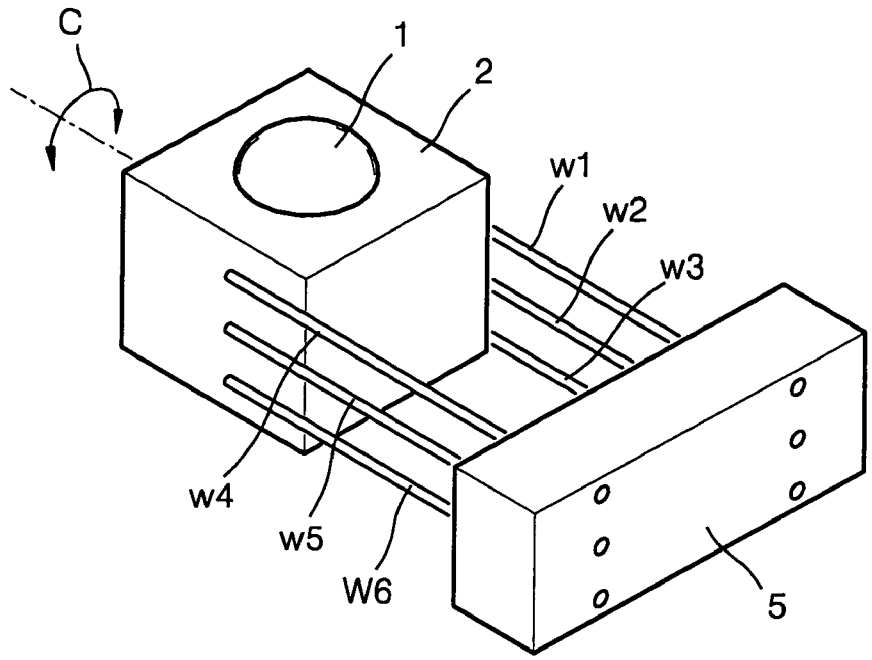
FIGS. 2A and 2B are views illustrating the blade support structure using the wires in the objective lens driving apparatus of FIG. 1.
Figure 2B:
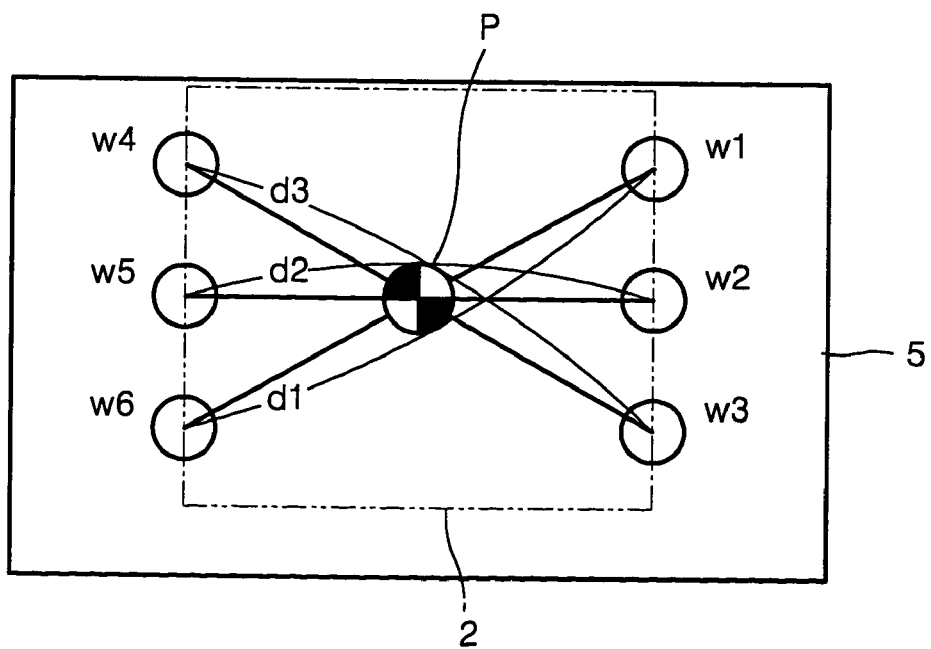
Figure 3A:
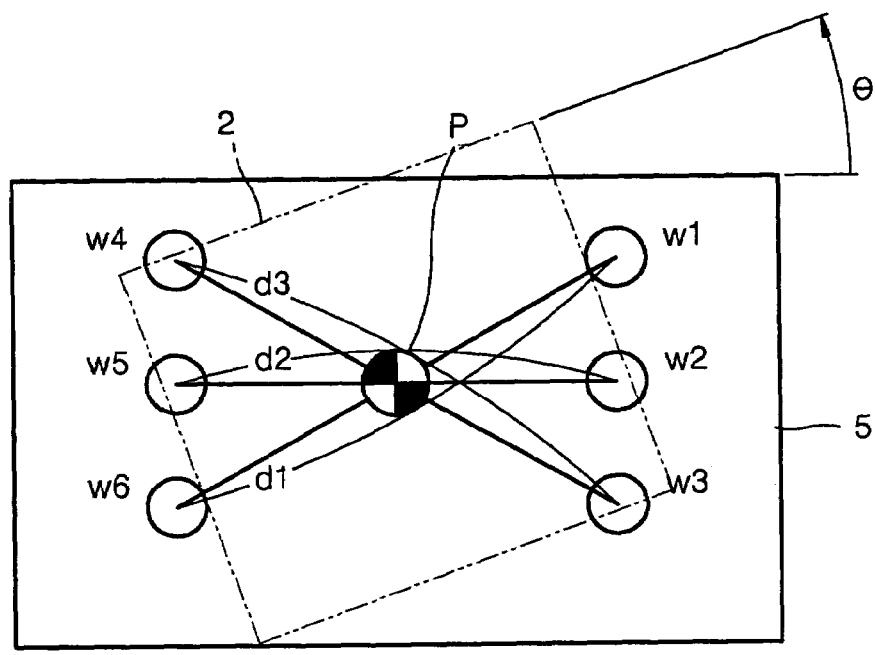
FIGS. 3A through 4B are views illustrating states in which the wires are deformed during tilt control in the objective lens driving apparatus of FIG. 1.
Figure 3B:
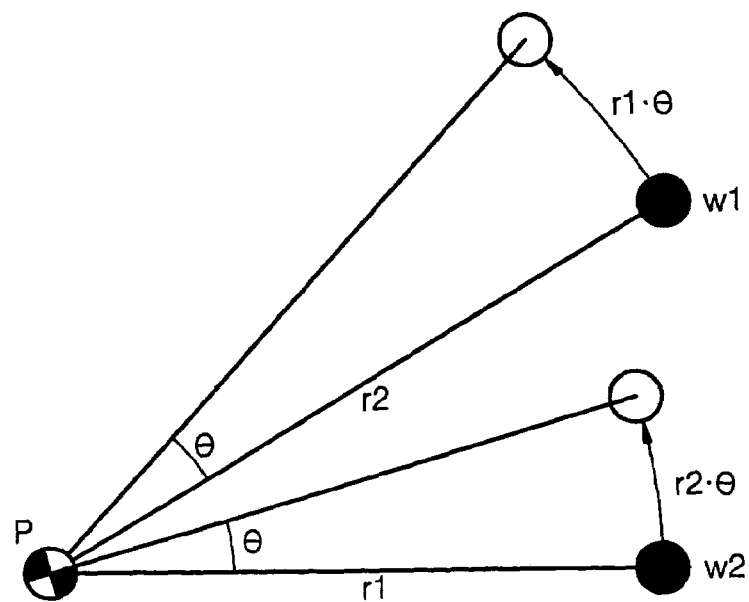
Figure 4A:
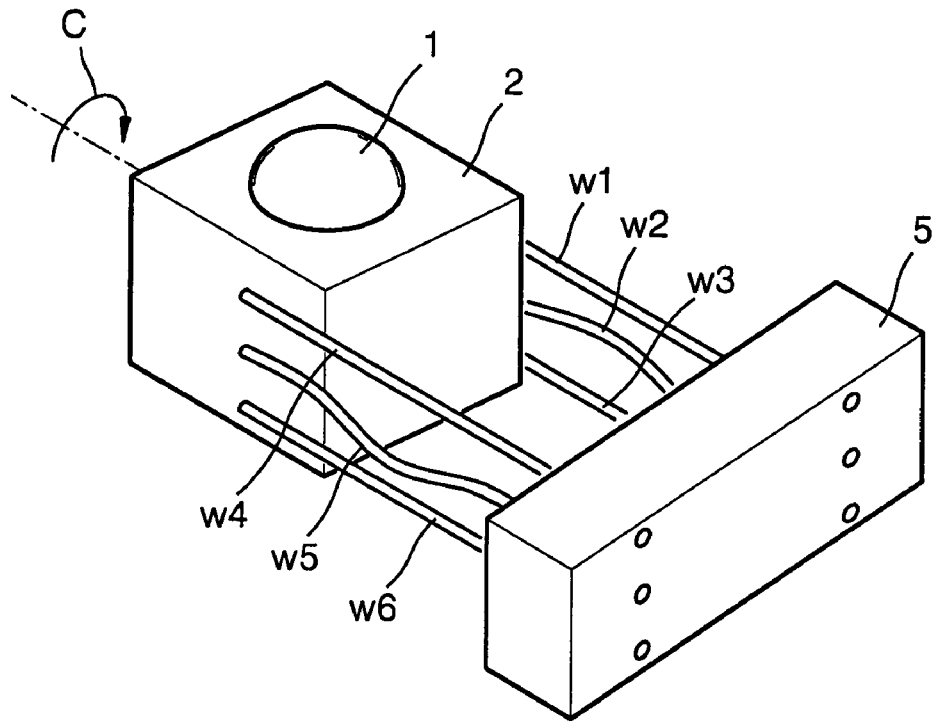
Figure 4B:
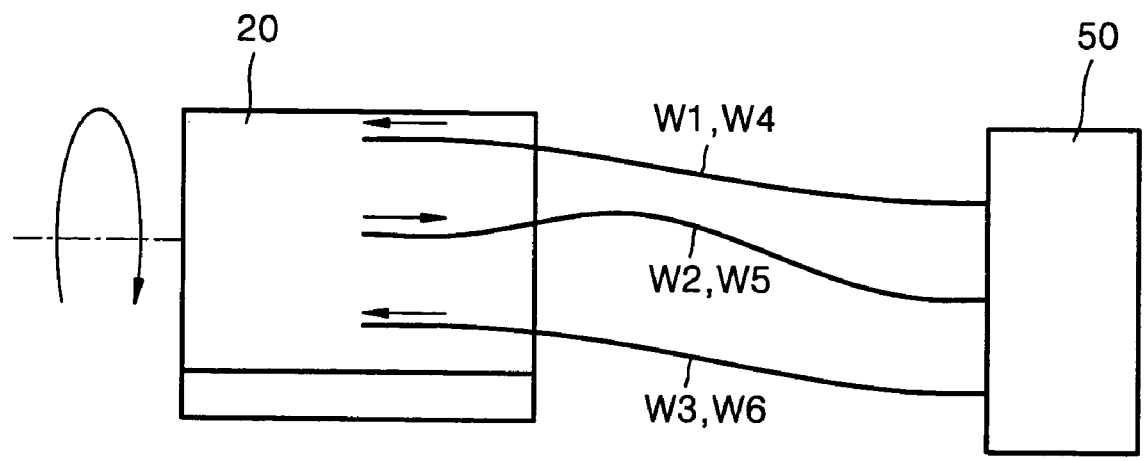

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 5:
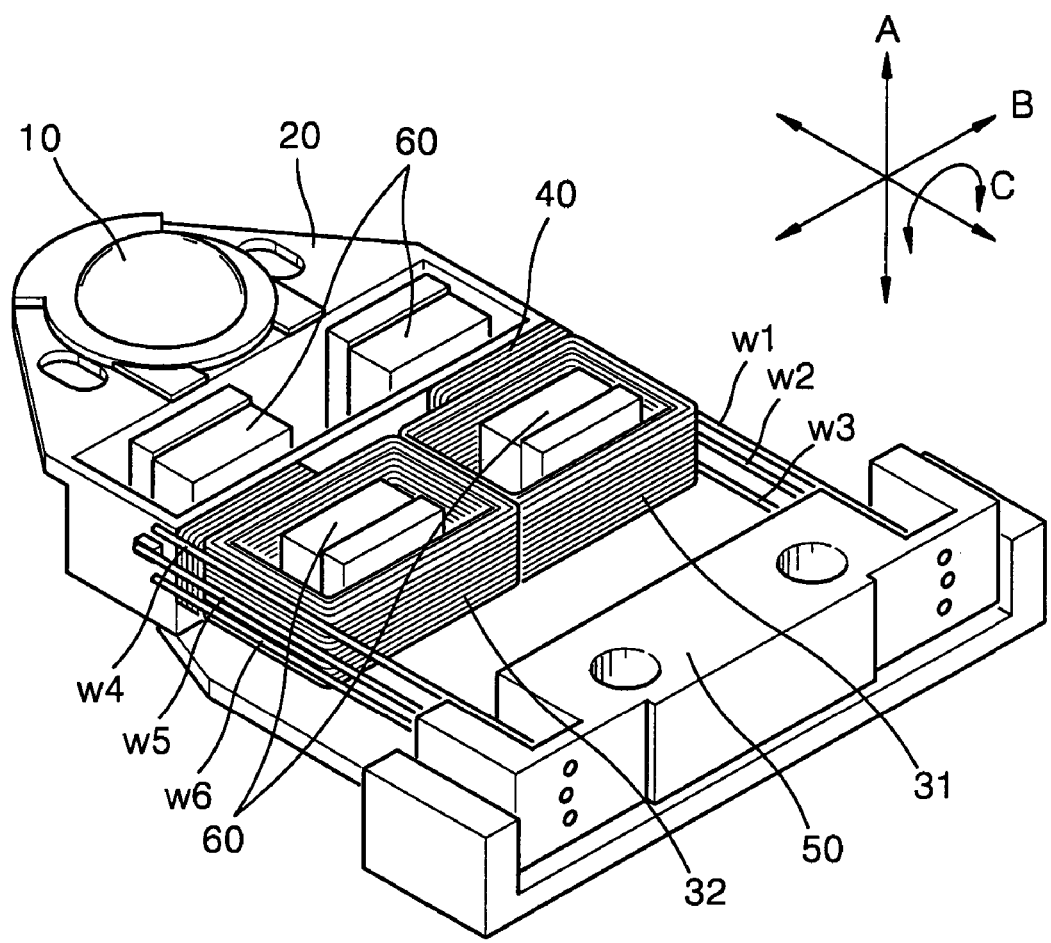
FIG. 5 is a view illustrating an objective lens driving apparatus according to an embodiment of the present invention.

Referring to FIG. 5, in an objective lens driving apparatus for an optical pickup, according to an example embodiment of the present invention, a blade 20 having an objective lens 10 mounted thereon is movably supported by a plurality of wires W1–W6, i.e., elastic support members, on a holder 50. Focus coils 31 and 32, a tracking coil 40, and a magnet 60 are provided as a servo-mechanism to drive the blade 20 in a focusing direction A, a tracking direction B, and a tilt direction C. For tracking control, current can be applied to the tracking coil 40 to drive the blade 20 in the tracking direction B through an interaction with the magnet 60. Also, for focus control, current can be identically applied to both focus coils 31 and 32 to drive the blade 20 in a focusing direction A. Also, for tilt control, different amounts of current can be applied to the respective focus coils 31 and 32 to rotate the blade 20 in the tilt direction C.

Figure 6:
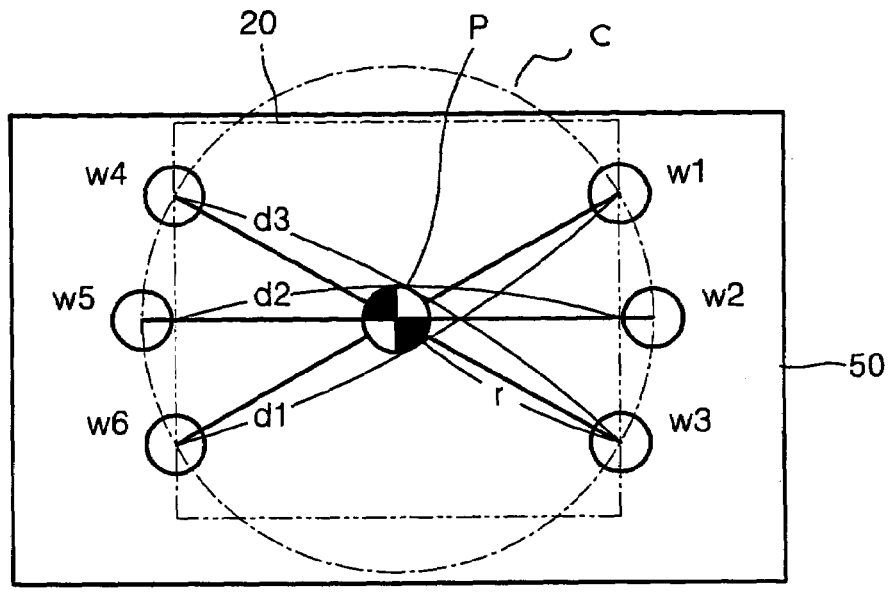
FIG. 6 is a view illustrating a blade support structure using wires in the objective lens driving apparatus of FIG. 5.

According to one aspect of the present invention, the wires W1–W6 supporting the blade 20, to be elastically movable with respect to the holder 50, are arranged as shown in FIG. 6. As shown in FIG. 6, the wires W1–W6 are symmetrically arranged with respect to a point P i.e. the center of rotation during the tilt control. For two wires arranged oppositely with respect to the point P that are paired (i.e. W1 and W6, W2 and W5, and W3 and W4), the distance between the opposite wires is substantially identical in all of the pairs (d1=d2=d3). In addition, fixed positions of both ends of each wire, which are fixed to the holder 50 and the blade 20, respectively, are all a same distance r from the center of rotation P. Thus, if an imaginary circle C having a radius r and the center P is drawn so as to be substantially vertical with respect to a horizontal surface of a disc above which the blade 20 is supported and substantially parallel with interior surfaces of the holder 50 and the blade 20, as illustrated in FIG. 6, the fixed positions of the all wires W1–W6 appear, to a hypothetical observer positioned along a line extending through a center of the blade 20 and the holder 50, to be located on a circumference of the imaginary circle C.

Figure 7:
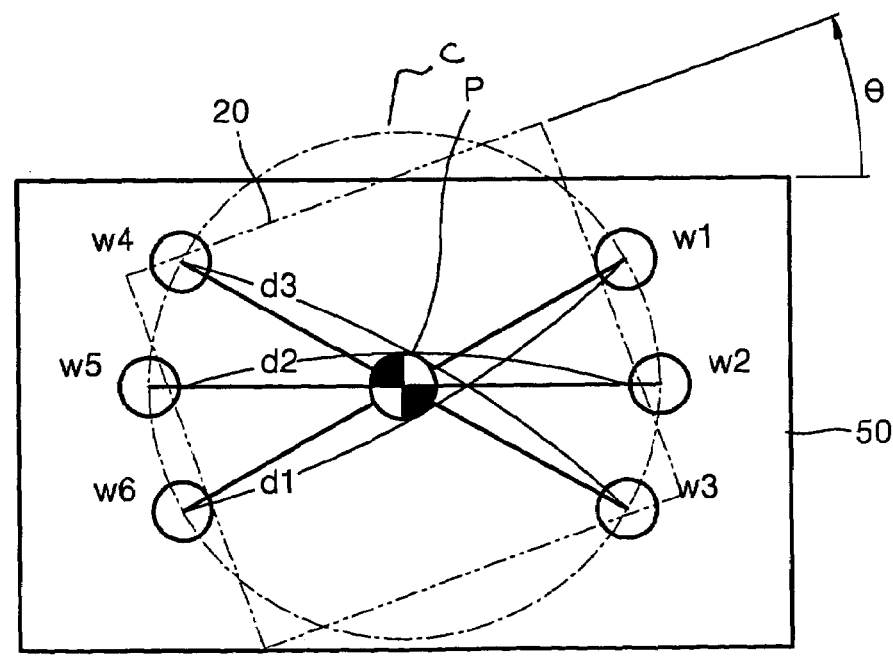
FIGS. 7 through 8B are views illustrating states in which the wires are deformed during tilt control in the objective lens driving apparatus of FIG. 5.
Figure 8A:
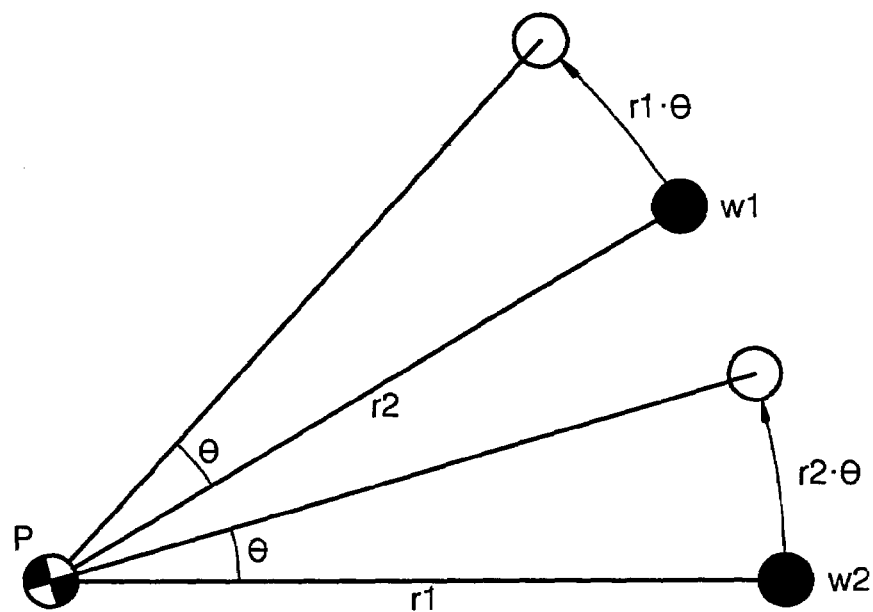
Figure 8B:
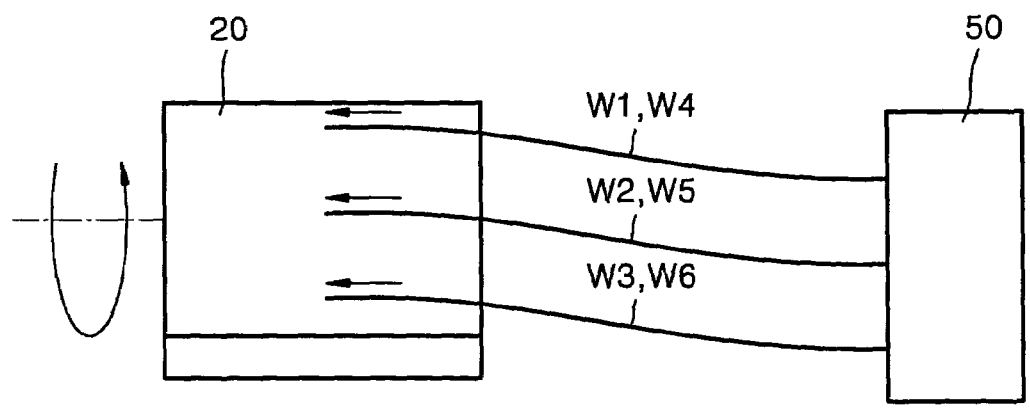

In the above structure, when the blade 20 rotates by an angle θ during a tilt control movement, as shown in FIG. 7, the wires W1–W6 supporting the blade 20 are bent. The amounts of deformation of the wires W1–W6 are substantially identical, as shown in FIG. 8A. That is, since all wires W1–W6 are separated the same distance r from the center P of rotation, the amounts of deformation of the wires W1–W6 are all substantially equal e.g., r×θ. Thus, as shown in FIG. 8B, since substantially the same tensile force acts on each wire, the previously described phenomenon in which some wires can be buckled does not occur. Thus, when a vibration or impact is applied to the optical pickup, the blade 20 is prevented from moving in an undesired direction so that the control of the position of the objective lens 10 can be stably performed.

Figure 9:
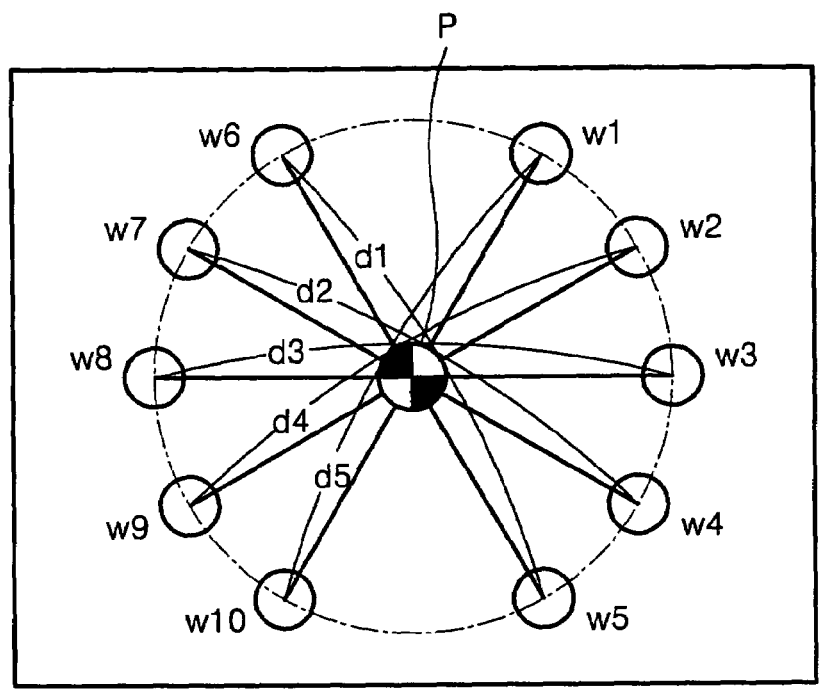
FIGS. 9 and 10 are views illustrating other examples of the blade support structure of FIG. 5.

Although three pairs i.e. six wires are described in the preferred embodiment, a greater number of wires e.g., ten wires W1–W10 shown in FIG. 9, can be symmetrically arranged at the same distance from the center P of rotation (d1=d2=d3=d4=d5), and the same effect obtained.

Figure 10:
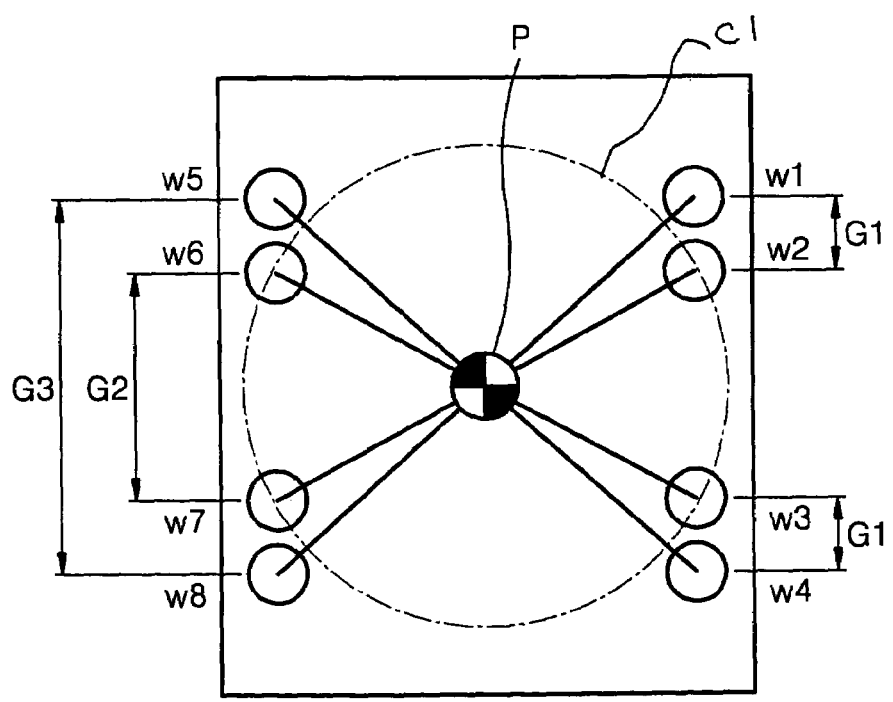

According to another aspect of the present invention, wires can be arranged as shown in FIG. 10. A first group of wires W2, W3, W6, and W7 are arranged at the same distance d1 from the center P of rotation, and a second group of wires W1, W4, W5, and W8 are all arranged at another distance d2 from the center P of rotation. As illustrated in FIG. 10, a gap G1 between the neighboring wires of the first and second groups is less than either gap G2 between wires of the first group and G3, between wires of the second group. This arrangement, as illustrated in example FIG. 10 can be useful when accurately arranging all wires on a circumference of an imaginary circle is difficult.

With an example arrangement as illustrated in FIG. 10, compression force acting on some of the wires can be minimized. That is, when a second group of wires W1, W4, W5, and W8, not located on a circumference C1, are arranged close to a first group of the wires W2, W3, W6, and W7, arranged on the circumference C1, even when an amount of deformation generated in different wires is different, this difference is small. Thus, a small amount of a compression force that could otherwise buckle the wires is generated accordingly. As a result, a more stable control of the blade 20 can be achieved possible. Therefore, the above wire arrangements provides a more stable control even when a small amount of an impact or vibration is applied.

As described above, the objective lens driving apparatus of the optical pickup according to the present invention, by reducing the difference in the amount of deformation between the elastic support members supporting the blade during tilt control, the elastic support members are prevented from moving in undesired directions when a impact or vibration is applied or generated. Thus, the control of the position of the objective lens can be more stably performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A driving apparatus, comprising:
   a blade on which an object is mounted;
   a servo-mechanism to drive the blade in a plurality of directions; and
   a plurality of elastic support members, to support the blade, the elastic support members being elastically movable with respect to the blade and located outside of the servo-mechanism; wherein the plurality of elastic support members are grouped into at least three pairs of elastic support members, a member of each pair arranged to face an other member of the pair with respect to a center of rotation of the blade, with distances between the elastic support members in the respective pairs being substantially equal.

2. A driving apparatus as set forth in claim 1, wherein the object mounted on the blade is an objective lens, and the driving apparatus is a driving apparatus for an optical pickup.

3. A driving apparatus, comprising:
   a blade on which an object is mounted;
   a plurality of elastic support members supporting the blade and capable of elastically moving with respect to the blade; and
   a servo-mechanism driving to drive the blade in a plurality of directions;
   wherein the plurality of elastic support members are divided into a first group of elastic support members symmetrically arranged at positions separated a first distance from a center of rotation of the blade and a second group of elastic support members symmetrically arranged at other positions separated an other distance from the center of rotation, and a gap between a neighboring elastic support member of the first group and an elastic support member of the second group is smaller than gaps between the elastic support members in their own group.

4. A driving apparatus as set forth in claim 3, wherein the object mounted on the blade is an objective lens, and the driving apparatus is a driving apparatus for an optical pickup.

5. A driving apparatus, comprising:
   a blade on which an object to be driven is mounted;
   a servo-mechanism to drive the blade in a plurality of directions;
   a plurality of elastic support members, the plurality of elastic support members arranged in at least three pairs outside of the servo mechanism; and
   wherein a distance from a center of rotation of the blade to each end of each of the plurality of elastic support members is substantially equal.

6. A driving apparatus as set forth in claim 5, wherein the object mounted on the blade is an objective lens, and the driving apparatus is a driving apparatus for an optical pickup.

7. A driving apparatus as set forth in claim 5, wherein a deformation ability of each of the plurality of elastic support members arranged in pairs is substantially equal.

8. A driving apparatus, comprising:
   a blade on which an object to be driven is mounted;
   a servo-mechanism to drive the blade in a plurality of directions;
   a plurality of elastic support members, the plurality of elastic support members arranged in a first group of pairs and a second group of pairs; and
   wherein a distance from a center of rotation of the blade to each end of each of the elastic support members in the first group is substantially equal to a first distance, the distance from a center of rotation of the blade to each end of each of the elastic support members in the second group is substantially equal to a second distance, the first and second distances not substantially equal to each other, and the distance between ends of members in different groups of pairs is less than a distance between ends of members in different pairs of a same group.

9. A driving apparatus as set forth in claim 8, wherein the object mounted on the blade is an objective lens, and the driving apparatus is a driving apparatus for an optical pickup.

10. A driving apparatus as set forth in claim 8, wherein a deformation ability of each of the plurality of elastic support members arranged in pairs is substantially equal.

11. A driving apparatus, comprising:
    a blade on which an object to be driven is mounted;
    a mechanism to drive the blade in a plurality of directions; and
    at least three pairs of elastic support members with a fixed position of each of the elastic support members being substantially located on an imaginary circle having a center on an axis of rotation of the blade, the elastic support members being outside of the mechanism.

12. A driving apparatus, comprising:
    a blade on which an object to be driven is mounted;
    a mechanism to drive the blade in a plurality of directions; and
    at least three pairs of elastic support members, outside of the mechanism, each elastic support member being deformed a substantially equal amount during a movement of the blade.

13. A driving apparatus, comprising:
    a blade on which an object to be driven is mounted;
    a mechanism to drive the blade in a plurality of directions; and
    at least three pairs of elastic support members each having a substantially same amount of tensile force during a movement of the blade, the elastic support members being located outside of the mechanism.

14. A driving apparatus, comprising:
    a blade on which an object to be driven is mounted;
    a mechanism to drive the blade in a plurality of directions;
    a plurality of elastic support members, the plurality of elastic support members arranged in at least three groups of pairs;

wherein each distance from a center of rotation of the blade to an end of each of the plurality of elastic support members in a first group is substantially equal, each distance from a center of rotation of the blade to an end of each of elastic support members in the second group is substantially equal to a first distance, each distance from the center of rotation of the blade to an end of each of the elastic support members in the third group is substantially equal to a second distance different than the first distance, and a distance between ends of members in different groups of pairs is less than a distance between ends of members in different pairs in a same group.

15. A driving apparatus, comprising:

a blade on which an object is mounted;

a servo-mechanism to drive the blade in a plurality of directions; and a plurality of elastic support members, to support the blade, the elastic support members being elastically movable with respect to the blade and located outside of the servo-mechanism; wherein the plurality of elastic support members are grouped into at least three pairs of elastic support members, a member of the pair arranged to face an other member of the pair with respect to a center of rotation of the blade, and distances between the elastic support members in the respective pairs are substantially equal.

16. A driving apparatus, comprising:

a blade on which an object to be driven is mounted;

a servo-mechanism to drive the blade in a plurality of directions;

at least three pairs of elastic support members arranged outside of the servo mechanism; and wherein a distance from a center of rotation of the blade to each end of each of the elastic support members is substantially equal.

* * * * *